Jan. 4, 1927.
W. E. WINE
1,613,002
TRACTOR WHEEL
Filed August 15, 1925  2 Sheets-Sheet 1
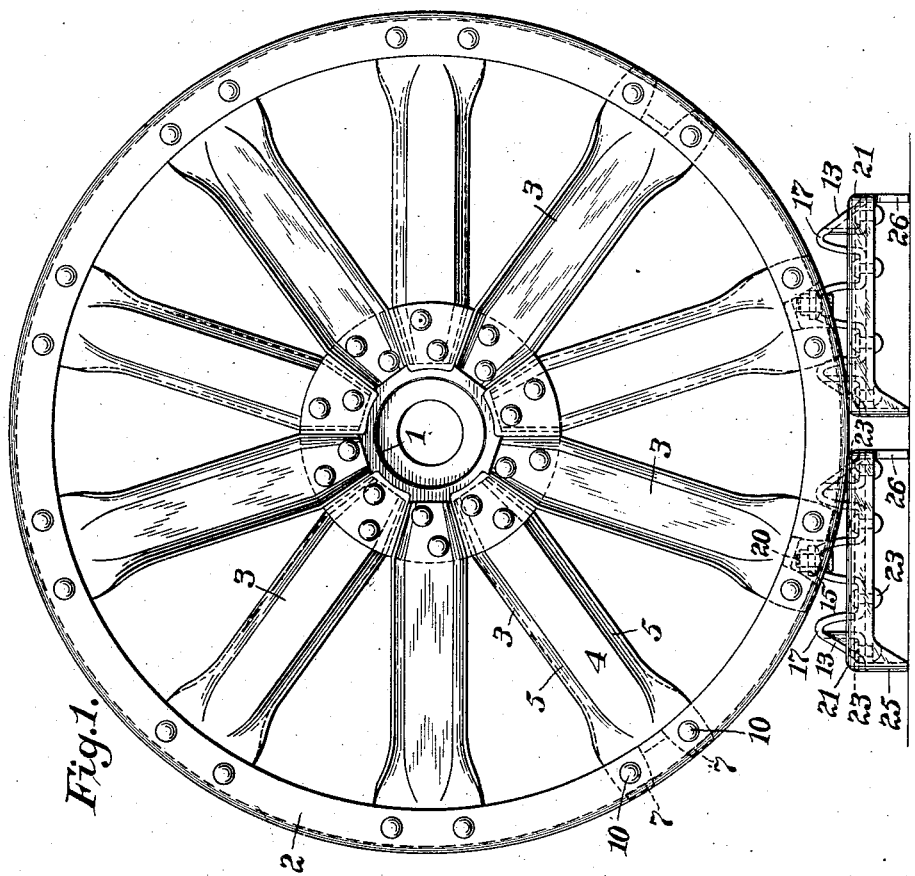
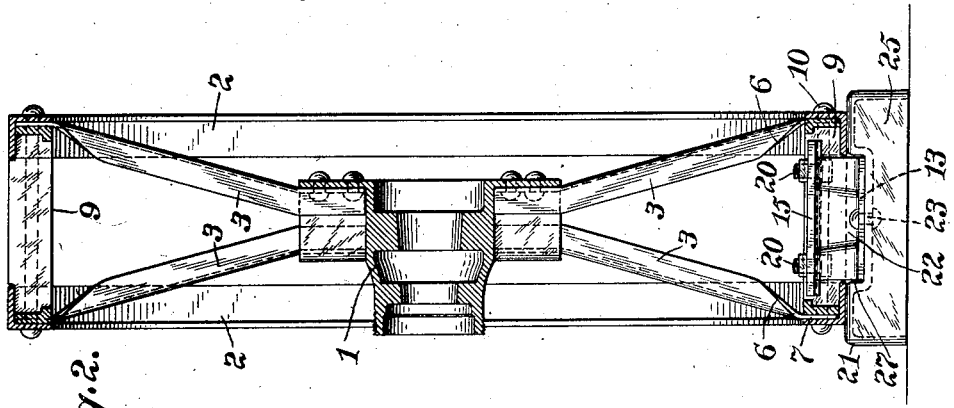
Inventor:
William E. Wine,
by Parker Cook.
Atty.

Jan. 4, 1927.  
W. E. WINE  
TRACTOR WHEEL  
Filed August 15, 1925  
1,613,002  
2 Sheets-Sheet 2
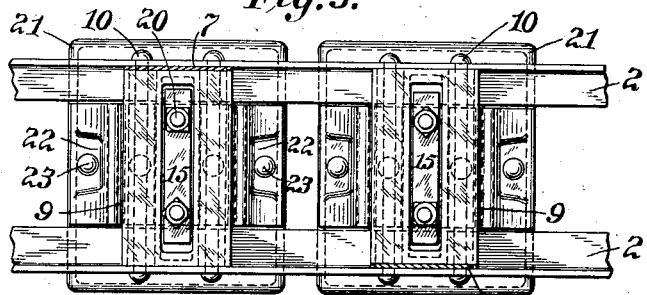
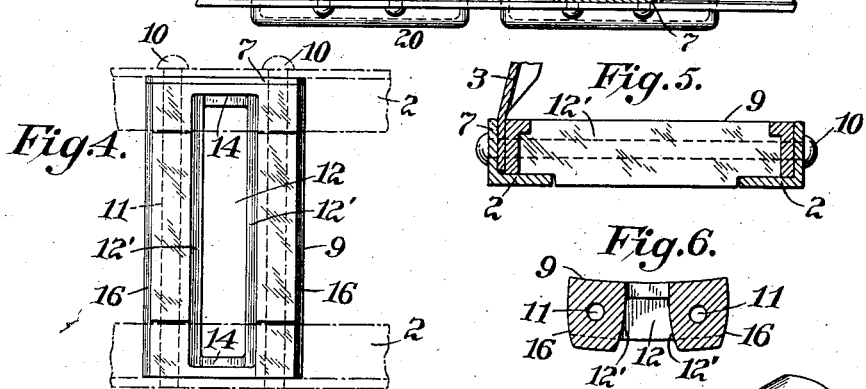
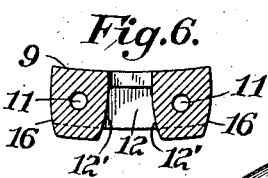
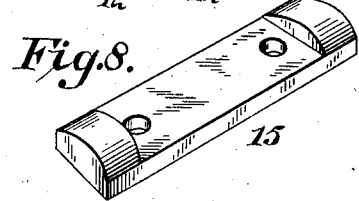
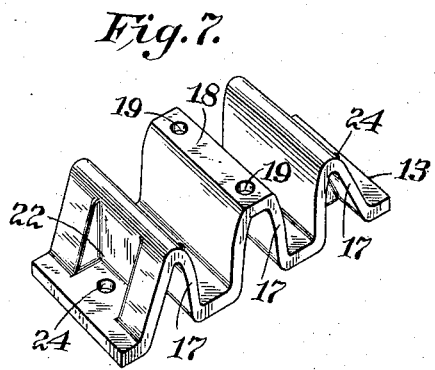
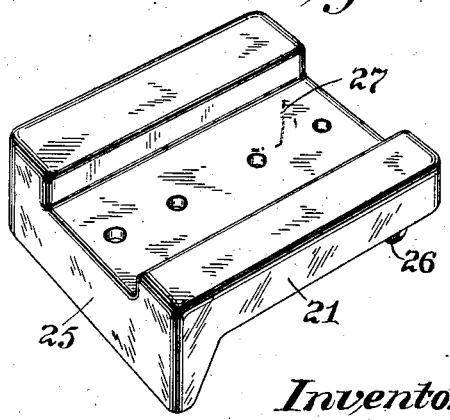
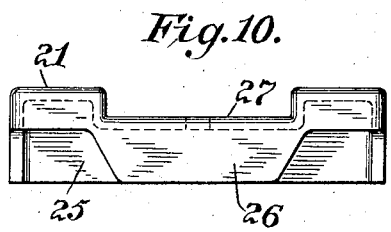
Inventor:  
William E. Wine,  
by Parker Cook  
Atty.

Patented Jan. 4, 1927.

1,613,002

UNITED STATES PATENT OFFICE.

WILLIAM E. WINE, OF TOLEDO, OHIO, ASSIGNOR TO THE TRACTOR GRIP WHEEL COMPANY, OF TOLEDO, OHIO, A CORPORATION OF OHIO.

TRACTOR WHEEL.

Application filed August 15, 1925. Serial No. 50,511.

My invention relates to new and useful improvements in tractor wheels and more particularly to the retaining means for a tractor shoe which in turn is held on the tractor wheel.

The arrangement of the wheel, that is, the hub, the annuli, the casing and the way these parts cooperate, and are arranged and fastened to each other, form the subject matter of a divisional application, filed by me on January 29, 1926, and bearing Serial Number 84,596, which has resulted in Patent No. 1,587,935.

An object of the invention is to provide a retaining means adapted to be secured to a skeleton rim of a tractor wheel, and arranged to cooperate with the tractor shoe to hold the same in proper position.

With these and other objects in view, the invention consists in certain new and novel arrangements and combination of parts as will be hereinafter more fully described and pointed out in the claims.

Referring now to the drawings showing a preferred embodiment of my invention:

Fig. 1 is a side elevation showing two of the shoes supporting the load, the other shoes not being shown.

Fig. 2 is a transverse section through the center of the wheel.

Fig. 3 is a fragmentary plan view taken from within the rim and showing two of the spaced blocks, the tractor shoes, and the ends of the alternate spokes.

Fig. 4 is a slightly enlarged detail view of a spacer block, the tractor shoe and retaining means being omitted for the sake of clearness.

Fig. 5 is a transverse section of the same.

Fig. 6 is a longitudinal section of the same.

Fig. 7 is a perspective view of the retaining member.

Fig. 8 is a perspective of the cross bar of the retaining means, shown in its inverted position.

Fig. 9 is a perspective of the tread member of the tractor shoe, and

Fig. 10 is a rear end elevation of the tread member.

Referring now to the several views, there is shown in a general way, in Figs. 1 and 2, a form of tractor wheel to which the present wheel may be readily applied, although any other similar form of wheel may be used with the invention. The tractor wheel in the present showing comprises a metal hub 1, two rings 2 which are made up of two annularly arranged angle members to form a skeleton rim and a plurality of spokes 3 having their inner ends set within and riveted to the hub 1, while their outer ends are secured alternately to the oppositely arranged rings 2 that form the rim.

Referring more particularly to the spokes 3, it will be seen that each spoke consists of a flat body portion 4 having the side flanges 5 which flanges are spread away near the outer end of the spoke as at 6 to leave the flat end 7.

The inner end of each spoke is beveled or wedge shaped so that when all of the spokes are fitted within the hub and riveted they appear as shown in Fig. 1, the spokes of course appearing oppositely faced.

The inner ends of the spokes are alternately riveted to the opposite side of the hub, as may be seen in Fig. 2 while the outer ends of the several spokes are arranged to be secured first to one ring and then to the other so that the alternate sides of the skeleton rim are equally braced.

*Casings or spacer blocks.*

Referring now to the casings or spacer blocks and to Figs. 2 to 6 inclusive, there is shown a rectangular steel casting 9 fitting between the flanges of the annular members 2, long rivets or bolts 10 being passed through openings or holes 11 in the ends of the spacer 9, these rivets also passing through the flattened end 7 of one of the spokes 3.

It will be noticed that the length of this spacer block 9 is the distance between the flanges of the two spaced rings 2 minus the width of the end 7 of a spoke 3, so that when the end of a spoke is inserted when the wheel is being assembled between one end of the spacer block and the flange of the rim, the spacer block, plus the end of the spoke will be equal to the distance between the two flanges of the rim, and the riveting or bolting of these parts together will tightly hold the spacer block, the spoke and the rings in their set position.

As will be seen in Fig. 3, the outer end 7 of the spoke may be seen secured at the one end of the first spacer block, while the outer end of the next spoke may be seen at the opposite end of the following spacer block which arrangement is carried out throughout the construction of the wheel.

Referring again to the spacer block in detail, it will be seen that a rectangular opening 12 is provided, the side walls 12' of these openings being beveled to form a tooth surface to cooperate with the retaining means 13 of the tractor shoe which will be described more in detail as the specifications proceed.

As may clearly be seen in Fig. 4, the inner end walls of the opening 12 are recessed as at 14, for the reception of the rounded ends of a retaining bar 15, which will also be shortly described.

The outer side walls 16 of the spacer block 9, are also rounded or beveled as may be understood from Fig. 6, so that an intermeshing spur movement is provided between the several teeth of the retaining means 13, and the several so formed teeth of the housing or spacer 9.

As far as the specifications have proceeded, it will be seen that I have provided a hub, a skeleton rim, formed of two rings, each of the rings in turn being formed of angle iron, and also provided a plurality of casings that extend between the two rims to thus brace the same, which casings in turn each have a spoke secured to one end thereof, the length of each casing being such that the end of the spoke may be inserted between the same and one of the rings of the rim. The casings in turn are arranged to provide the necessary teeth to cooperate with the teeth of a retaining member, which latter member in turn is secured to a tread member, these two comprising the tractor shoe.

The matter so far referred to forms the subject matter of a divisional application which has resulted in Patent No. 1,586,935 of June 1, 1926; that is, the construction of the wheel proper with the casings locked or riveted in place, which casings not only form the completed rim, but form housings for the retaining members now about to be described.

Retaining member.

Referring now more in particular to Fig. 7 there is shown in perspective the retaining member 13 which consists of a metal plate pressed to form a plurality of teeth 17, the center tooth being flat at its crown 18 and provided with the two holes 19 so that the retaining bar 15 may be bolted or riveted thereto, the bar being inverted from the position shown in Fig. 8.

I prefer to use bolts 20 as may be seen in Figs. 1 and 2 so that the assembly may be quickly made and the retaining means and tread 21 may be quickly removed and a new shoe inserted, if necessary.

Referring again to the retaining means 13 it will be seen that I have formed a depression 22 in each end thereof so that a rivet 23 may be passed through a hole 24 formed in the bottom of the retaining means, which rivet in turn passes through the tread member 21 as will be shortly mentioned. In a like manner, I pass other rivets similar to 23 through other holes formed between each tooth in the bottom of the retaining means as may be seen in Fig. 1.

Tread member.

The tread member 21 is similar to the tread members shown in several of my applications, it consisting of a plate bent in boxlike form and may be stamped out in quantities on a hundred ton press. One of the ends 25 extends completely across the width of the shoe while the opposite end 26 is reduced as may be seen in Fig. 10, so that as the different shoes contact with the ground a short and then a long contact or traction effort is obtained.

Running the length of the shoe is the depression or channel 27, the width of the latter being such that it will receive the retaining member 13, so that the side walls of the channel, together with plurality of rivets 23 will tightly hold the retaining means and the tread member 13 in fixed relation with each other.

These tread members and retaining means may be made up in quantities and to assemble or apply these tractor shoes as a whole the center tooth of the retaining means will be passed through the rectangular opening 12 in the spacer 9, after which the retaining bar 15 will be securely bolted to the center tooth along the crown 18, the ends of the bar resting within the recesses 14, thus rockingly holding the retaining means and tread member to the rim of the wheel.

By constructing the spacer block with the two teeth and the recess between them, and by providing the retaining member with the several teeth, I have secured the proper intermeshing or driving action between the tractor shoe and the spacer block, and I have also secured and made it possible for the retaining means and tread member to move slightly in a vertical direction, so that the load falls on the tread member, and the retaining means simply supports the load or weight of the tractor shoe, as the wheel revolves, the teeth, of course, being subjected to the driving action of the wheel but not supporting the weight.

From the foregoing it will be seen that I have provided a tractor wheel that is relatively strong, may be quickly and readily assembled, the skeleton rim being braced by the spokes and spacer blocks, which spacer blocks in turn provide the housings for the retaining means, the retaining means and housings, or casings, being so arranged that the desired intermeshing of the two parts is secured to properly transfer the driving action from the wheel to the tread members, and at the same time allowing the load to fall on the tread member, and allow the shoes to move slightly inwardly and outwardly as well as rock with relation to the rim.

Many slight changes might be made without in any way departing from the spirit or scope of the invention.

Having thus described the same, what I claim as new and desire to secure by Letters Patents is:—

1. A retaining means for a tractor shoe comprising a strip of metal bent upwardly and downwardly between its ends to form three teeth, the crown of the center tooth being flattened and provided with openings therein, the outer walls of the two outer teeth being pressed inwardly to form two respective pockets, each of said pockets having an opening in the bottom thereof, the crown of the center tooth adapted to receive a locking bar, and the retaining means adapted to be secured to a tread member.

2. A retaining means adapted to be secured to a tractor wheel and a tread member, said retaining means comprising the teeth 17, the crown 18, with the holes 19, and the depressions 22.

In testimony whereof I affix my signature.

WILLIAM E. WINE.